United States Patent

[11] 3,584,446

| [72] | Inventor | Fritz Bernshausen |
| | | 1109 W. G St., Elizabethton, Tenn. 37643 |
| [21] | Appl. No. | 7,027 |
| [22] | Filed | Jan. 30, 1970 |
| [23] | | Division of Ser. No. 718,552, April 3, 1968, Patent No. 3,507,101 |
| [45] | Patented | June 15, 1971 |

[54] TREE FRUIT CULTIVATING AND HARVESTING SYSTEM
13 Claims, 10 Drawing Figs.

[52] U.S. Cl. .................................................. 56/328,
56/236, 239/172, 239/286
[51] Int. Cl. .................................................. A01g 19/00
[50] Field of Search .......................................... 56/1, 328,
330, 236, 329, 235; 239/146, 172, 186, 273, 279,
286, 287; 47/20, 21

[56] References Cited
UNITED STATES PATENTS

| 272,843 | 2/1883 | Lowrey | 56/236 |
| 424,803 | 5/1890 | Lowell | 56/236 |
| 1,348,038 | 7/1920 | Neumeyer | 239/172 X |
| 1,669,435 | 5/1928 | Wheeler | 239/172 X |
| 2,648,342 | 8/1953 | Vani et al. | 239/186 X |
| 3,072,131 | 1/1963 | DiLaurenzio | 239/286 X |
| 3,330,068 | 7/1967 | Carson | 56/235 X |
| 3,452,528 | 7/1969 | Fairchild et al. | 56/328 |
| 3,473,311 | 10/1969 | Fox | 56/330 |

Primary Examiner—Louis G. Mancene
Assistant Examiner—J. A. Oliff
Attorney—Jones & Lockwood ABSTRACT: A multiple purpose machine for cultivating and harvesting fruit trees in an orchard is described. The machine is constructed to straddle a row of trees, and performs operations on trees interiorly of the machine as the machine continuously moves along a tree row. The basic machine may be equipped for pruning and hedging, spraying, or harvesting. For harvesting, individual trees are surrounded by containers formed of extended flexible partitioning, the containers are filled with a cushioning material, the trees are shaken to dislodge the fruit therefrom, and a pneumatic conveying system withdraws the cushioning material from the container, allowing the fruit to gently settle on conveyor belts without bruise producing impacts. The cushioning material withdrawn from one container is deposited into a second container formed about a second tree, and as the first container is withdrawn from a harvested tree, a new container is formed around a third tree, so that the harvesting system operates continuously along the row of trees.

INVENTOR
FRITZ BERNSHAUSEN
Beale and Jones
ATTORNEYS

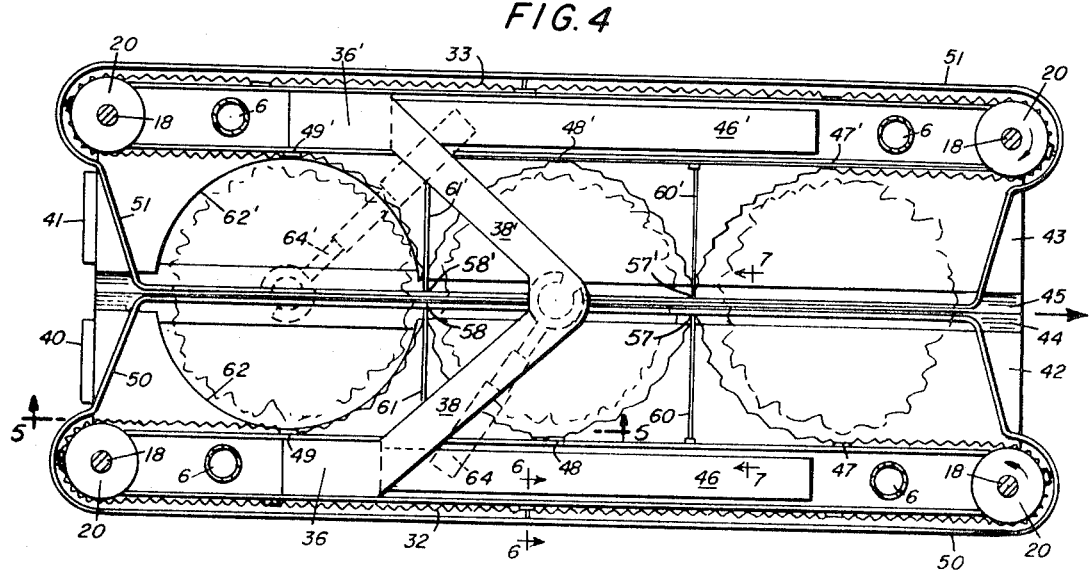
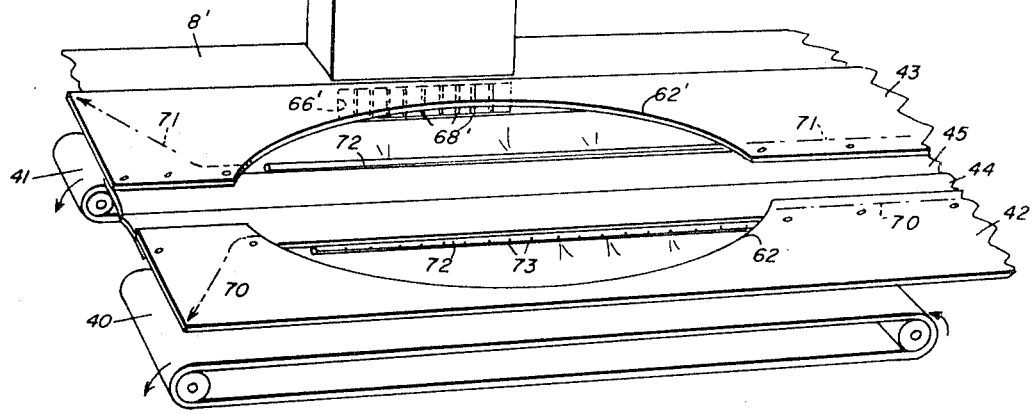
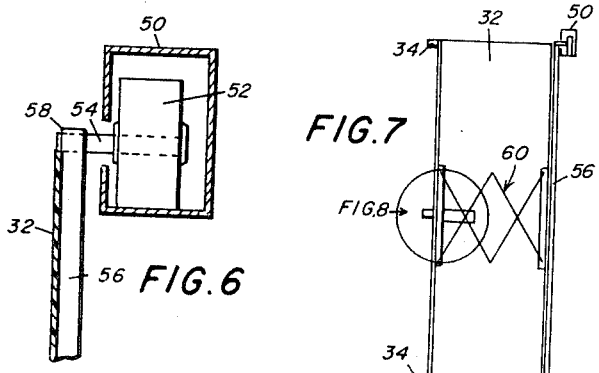
INVENTOR
FRITZ BERNSHAUSEN
ATTORNEYS

PATENTED JUN 15 1971

INVENTOR
FRITZ BERNSHAUSEN

Beale and Jones
ATTORNEYS

TREE FRUIT CULTIVATING AND HARVESTING SYSTEM

Cross-Reference

This is a division of application Ser. No. 718,552, filed Apr. 3, 1968 now U.S. Pat. No. 3,507,101, Apr. 21, 1970.

BACKGROUND OF THE INVENTION

The invention relates to the field of tree fruit cultivating and harvesting, and in particular is a system for mechanizing the various operations required in growing and harvesting tree fruit to the greatest extent possible, thus avoiding the known disadvantages of manual labor, such as high cost, unreliability, and unpredictable variations in skill.

Heretofore, the various operations necessary in growing and harvesting tree fruit, such as pruning, fertilizing, spraying with insecticides, and harvesting have been performed either manually, or with various different mechanical devices each suited to the particular operation. For instance, spraying of insecticides and fertilizer is usually accomplished by towing a rather large spraying system between the rows of trees; the spraying system is seldom adapted for any purpose other than spraying, and so is useful for only brief periods during the year.

Pruning and trimming is still basically a manual operation, but the workers may be equipped with power driven pruning shears. Elevatable platforms which move on some sort of powered vehicle between the rows of trees are also in limited use. These latter platforms may also be used in the harvesting operation to lift pickers to the appropriate places on the trees, but the actual picking is still done manually. The primary disadvantage of most forms of these platforms is that they will accommodate only one worker each, and are therefore quite costly per unit of production.

Various systems for mechanically harvesting tree fruit have been proposed, and some systems have been built and used in the field. The most common of these is a mechanism by which the tree is physically shaken, causing the fruit to be broken away from the branches and to fall to the ground. This method has the disadvantages of requiring manual labor to retrieve the fruit from the ground, and of causing the fruit to be bruised as it strikes the ground or strikes branches of the tree during its fall, thus decreasing its market value. To avoid these disadvantages, various catching frames have been proposed for placement under the tree to channel the fruit to a central collection point. These frames are equipped with some sort of a shock absorbing surface, but nevertheless do not completely eliminate bruising as the fruit falls onto the frame, and do nothing to prevent the bruising that occurs as the fruit strikes branches of the tree during its fall. In addition, the catching frames are quite cumbersome and, together with the mechanical shakers, require substantial space between the rows of trees to move from tree to tree.

SUMMARY OF THE INVENTION

This invention comprises a single tree fruit cultivating and harvesting machine to which various attachments may be made to perform the various operations required in an orchard at different times of the year. Manual labor is to the greatest extent possible excluded, so the problems of unreliability and high cost are substantially avoided. The system is self-propelled, and is designed so as to straddle a row of trees, rather than to move along a road between the row of trees. Thus, it is seen that a great advantage of the invention is that substantial spacing between the rows of trees is not required, and that a given orchard area can support approximately twice the number of trees, and thus twice the yield, as was possible with prior devices and harvesting methods.

The basic device is equipped for pruning by installing top and side sickle bars, or rotary cutters, to shape the trees to the proper form for later harvesting operations and for maximum fruit production. In addition, platforms may be attached to the device to allow manual pruning of the interior branches of the tree.

The device is converted to a sprayer by the installation of an appropriate spray tank, spray nozzles and distributors. The insecticide, fungicide, or fertilizer being sprayed may be directed both onto the row of trees which the device straddles and onto the rows on either side of the device. In spraying an orchard, therefore, the system is only required to pass over every other row of trees, thus further increasing its efficiency.

The harvesting attachment to the machine comprises a traveling partition system whereby as the machine advances along the tree row, individual trees are enclosed in containers, the walls of which are formed by the partitions, and the bottoms of which are formed by a split lower deck of the machine. A cushioning material, such as shredded styrofoam or foam rubber, is blown into the container formed around a tree, completely surrounding all parts of the tree and the fruit thereon. A shaker is attached to the tree, and as the fruit is shaken from the branches the fruit remains suspended and protected in the surrounding cushioning material. As the machine advances along the row, a cushioning withdrawal station moves into communication with the container, and by means of a fan and duct system pneumatically withdraws the cushioning from the container. Using the same fan and duct system the cushioning is then conveyed to the next advancing container which has in the meantime been formed around the next tree in the row. As the cushioning is withdrawn from the first container, the fruit interspersed within the material is lowered gently to the bottom of the container without without incurring bruise producing shocks, and two conveyor belts carry it to the rear of the machine where it may be deposited in appropriate receptacles.

In all of the above discussed operations, the machine moves continuously along the row of trees, speeding the operation and increasing the availability of the machine for operations on a greater number of trees.

It is thus seen that the invention provides several advantages over the machines and systems of the prior art. The disadvantages of manual labor are largely eliminated, but without sacrificing quality and marketability in the harvested fruit. A single system is provided for performing a multiplicity of operations in the orchard, thus reducing the grower's investment in equipment. The system operates continuously along a row of trees, thus saving the time taken by prior devices in transferring from tree to tree and allowing operation on more trees per unit time. Perhaps most importantly, a grower using the invention may plant about twice as many trees on a given acreage than was previously possible, thus doubling his yield per acre.

BRIEF DESCRIPTION OF THE DRAWINGS

The foregoing and additional objects, features and advantages of the invention will be apparent from the following detailed description of a preferred embodiment thereof, selected for purposes of illustration, and shown in the accompanying drawings, in which:

FIG. 4 is a plan view of the invention, taken in section along line 4-4 of FIG. 3.

FIG. 5 is a perspective cutaway view of the cushioning withdrawal station, generally along line 5-5 of FIG. 4.

FIG. 6 is a detail of the upper partition extender guide track taken along line 6-6 of FIG. 4.

FIG. 7 is a sectional elevation detail of the partition extender system taken along line 7-7 of FIG. 4.

FIG. 8 is a detailed showing of the connection between the drive chain and the partition extender scissors.

DESCRIPTION OF A PREFERRED EMBODIMENT OF THE INVENTION

Figure 1:
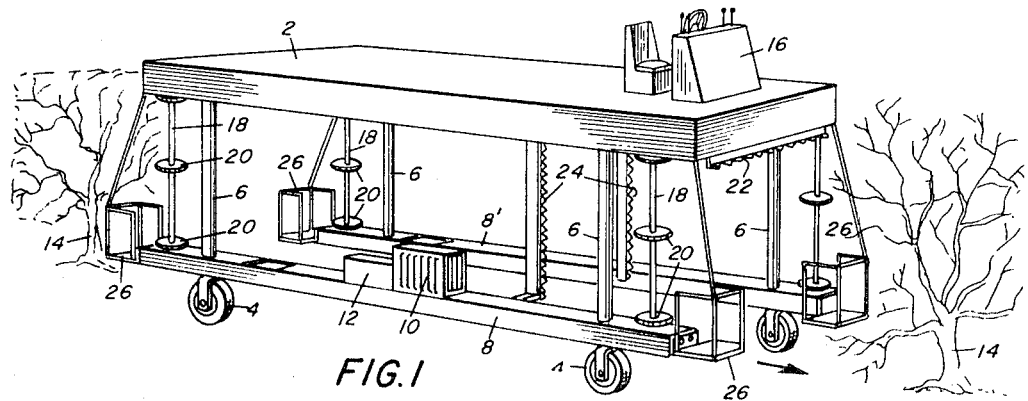
FIG. 1 is a perspective view of the invention equipped for trimming and pruning fruit trees.

As may be seen in FIG. 1, the basic frame of the tree fruit cultivating-harvesting machine consists of an upper horizontal deck portion 2 movably supported from the ground by wheels 4 on stiltlike columns 6. The columns 6 are joined along each side of the machine by horizontal rigid members 8, 8' which also serve to support an engine 10 and accessories 12 for providing power to all of the various moving systems discussed hereinbelow. The systems are powered by engine 10 through suitable drive means under the control of the operator.

The machine as shown in FIG. 1 is equipped with attachments for trimming and pruning fruit trees. Sickel bars 22, 24 trim the top and sides, respectively, of the trees so that the trees are held to a proper shape for maintenance by the cultivating and harvesting machine. As some trees will produce substantial growth beyond the level of trimming during the growing season, the sickle bars 22, 24 may be extended a substantial distance inwardly of the actual interior contours of the machine, so that after the growing season, the trees will not have grown to be too large for harvesting by the machine. Rotary cutters may be provided in place of sickle bars 22, 24 and cutters may also be provided at the bottom of the machine for mowing the orchard grass.

In addition to the sickle bars 22, 24, platforms 26, on which individual workers may stand to reach into and prune branches from the interior of the trees, are installed at each corner of the machine. Additional platforms (not shown) may be provided at each corner near the upper deck 2 of the machine, so that more workers will be available for faster pruning of the trees. In addition, because of the closer tree row spacing allowed with this form of cultivating and harvesting machine, the manual pruners may work upon the tree rows to either side of the machine, as well as the row which the machine straddles. Each worker may be equipped with a powered pruning cutter, which may be driven by power takeoff means driven by the engine 10 and power accessories 12.

Figure 2:
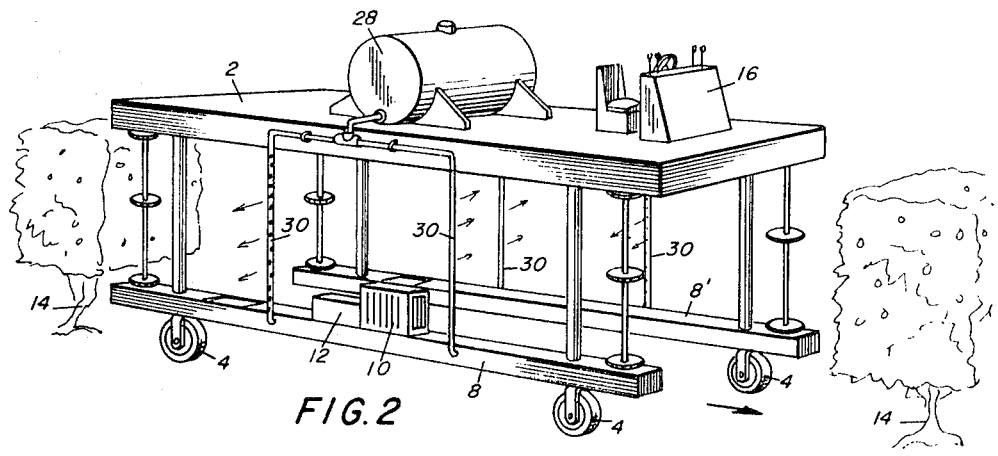
FIG. 2 is a perspective view of the invention equipped with a system for spraying fruit trees.

FIG. 2 shows the cultivating and harvesting machine equipped as a sprayer for distributing fungicides, insecticides, herbicides, or fertilizer onto the tree rows. In the embodiment shown, a tank 28 contains the liquid to be sprayed, which is forced through the spray headers 30 either by high pressure in the tank 28, or by providing a pump (not shown) in the line 31 leading to the spray headers 30. Alternatively, the tank or tanks 28 may be located on the lower cross members 8, 8' of the machine, so as to provide the machine with a lower center of gravity and increased stability. An "air carrier" system of spray distribution may be provided by leaving the fan and duct system, which is part of the harvesting system to be discussed below, attached to the machine, and distributing the liquid to be sprayed into the air currents generated by these fans. Either system directs the spray directly toward the trees, so that a minimum amount of the liquid being sprayed is wasted on the ground. In addition, the highly directional characteristic of the spray allows spraying operations to be conducted on windy days, which is not possible with most present systems.

Figure 3:
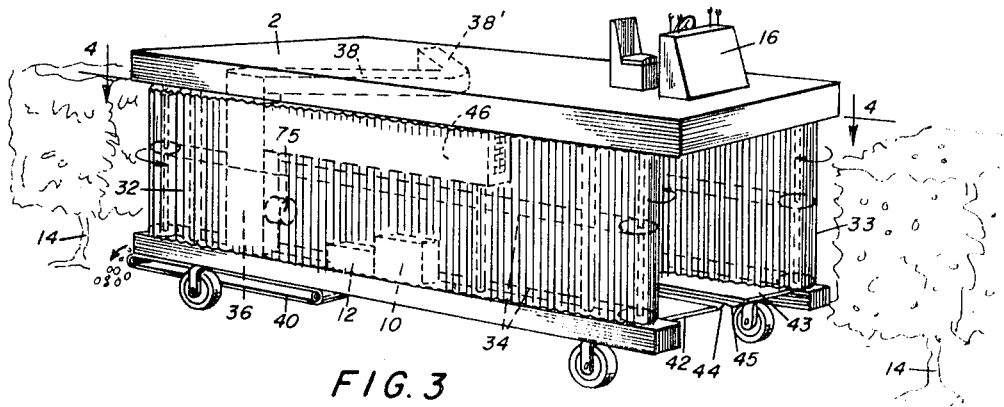
FIG. 3 is a perspective view of the invention equipped with automatic tree fruit harvesting system.

FIG. 3 illustrates the apparatus equipped for use in harvesting fruit from the trees. Vertical belts of flexible, pleated partitioning 32 and 33 are provided, one on each side of the machine. Each belt of the partitioning is driven by chain drives such as that illustrated at 34 on belt 32, the chains being mounted on powered shafts 18 and sprocket wheels 20. The powered shafts 18 and sprocket wheels 20 and are shown more clearly in FIG. 1. The linear speed of the partitioning, which moves with respect to the machine, is adjusted so that when the machine is moving, the speed of that portion of the partitioning which is on the interior of the machine is zero with respect to the ground, and thus with respect to any trees enclosed therein. Thus, on the interior of the machine the partitioning may be extended to form containers about the trees over which the machine passes. The containers so formed may be filled with cushioning material, and the tree enclosed therein shaken to remove the fruit therefrom. The cushioning may then be withdrawn from the containers through the bottom of vertical ducts 36, 36' and pneumatically conveyed through horizontal ducts 38, 38' to the next advancing container formed by the partition system. As the cushioning is withdrawn from a container, the fruit suspended therein is deposited upon conveyors 40, 41 located at each side of the machine an the fruit is carried off the machine to an appropriate receptacle. Split lower deck portions 42, 43 provide a bottom for the containers formed by the extended partitioning. The slot formed between the deck portions 42, 43 is provided to allow tree trunks to pass through the machine. The slot is sealed by two flexible flaps 44, 45, which may be of rubber or some other suitable material. When the machine is not in active harvesting operation, the cushioning is stored in chambers 46, 46'.

FIG. 4 illustrates more clearly how the containers are formed about each individual tree as the harvesting machine advances along the tree row. The flexible partitioning belt 32 is attached to the chains 34 at spaced points 47, 48, 49, corresponding to the spacing between the trees. At points 57, 58 along the partition, midway between the chain supported in an overhead track 50, as is more clearly illustrated in FIG. 6, which is a sectional view 6–6 at point 58. The guide track 50 is in the shape of a hollow channel which may be supported from upper decking 2, and a rotatable wheel 52 is attached by means of pin 54 to vertical bracket 56, to which is attached the flexible partitioning 32. The bracket 56 extends down the entire height of the partition.

Returning to FIG. 4, it is seen that as the partitioning advances along the interior of the machine, the guide rail 50 is so formed as to cause the rollably supported points 57, 58 of the partitioning to be extended to the centerline of the machine, there meeting the corresponding extended partition 33, supported at the other side of the machine at points 47', 48', 49', by chains 34 and at 57', 58' from track 51 to form a generally cylindrical container surrounding the tree on the interior of the machine. Referring to FIG. 7, which is a view at 7–7 of FIG. 4, it will be seen that extensible support scissors 60 extend between the middle chain 34 and the vertical bracket 56 to provide additional support for the flexible partitioning 32, and to connect the bracket 56 and rollers 52 with the driving force provided by center chain 34.

In similar manner, point 58 is supported by scissors 61, point 57' of curtain 33 is supported by scissors 60' and point 58' is supported by scissors 61'.

A detail of the arrangement of FIG. 7 whereby the extension scissors 60 are attached to drive chain 34 is shown in FIG. 8. A rigid member 59 is provided with vertical slots 63 in which the ends of scissors 60 are slidably mounted. As the partitioning is extended to form a container, scissors 60 are drawn out to the extended position shown in FIGS. 4, 7 and 8. Horizontal telescoping bracket 65 is rigidly mounted to remain perpendicular to chain 34 through member 59, and assists in holding scissors 60 rigid so that the driving force of chain 34 is transmitted to the extended partition.

Again referring to FIG. 4, it is seen that as the interior of the flexible partitioning advances to the rear of the machine, the track 50 is so shaped as to cause the partitioning to be withdrawn from its extended position, thus opening the back of the machine to allow the trees to pass out of the end of the machine after harvesting.

Lower deck plates 42, 43, which are carried by the machine, provide a bottom surface for the tree containers formed by the extended partitioning 32, 33. The plates 42, 43 are separated by a slot running the entire length of the machine, the slot being sealed by flexible flaps 44, 45 to allow the passage of the tree trunks therethrough as the machine moves down a row of trees. Near the rear of the machine, to the left, as viewed in the FIGS. the lower deck plates 42 are provided with semicircular cutouts 62, 62' to allow cushioning material to fall out of the containers formed by the extended partitioning 32, 33, as the containers move rearwardly with respect to the harvesting machine. The cushioning is retrieved by suction through the bottom of vertical ducts 36, 36' and is pneumatically conveyed through ducts 38, 38' to the next advancing container. As the cushioning is withdrawn through ducts 36, 36', the fruit suspended in the cushioning also passes downwardly through semicircular cutouts 62, 62', to conveyors 40, 41, which move the fruit to the rearward end of the machine for deposition in appropriate receptacles. To allow more time for withdrawal of the cushioning from the container, cutouts 62, 62', may be extended along the length of the machine into a generally elliptical shape, rather than circular as shown.

Telescoping shakers 64, 64', are provided on the underside of the machine (FIGS. 4 and 9) for grasping the trunks of the fruit trees and vibrating them to detach the fruit from the branches. The shakers may be equipped with extended feeler whiskers and servomotor controls to automatically attach the shaker to the appropriate tree trunk, or they may be attached to the tree trunk by any other suitable, known method. Shakers 64 are mounted on a swivel connection to the frame of the machine, so that they may remain attached to a particular tree for a sufficient period of time to complete the shaking operation as the harvesting machine continuously advances along the tree row.

Figure 10:
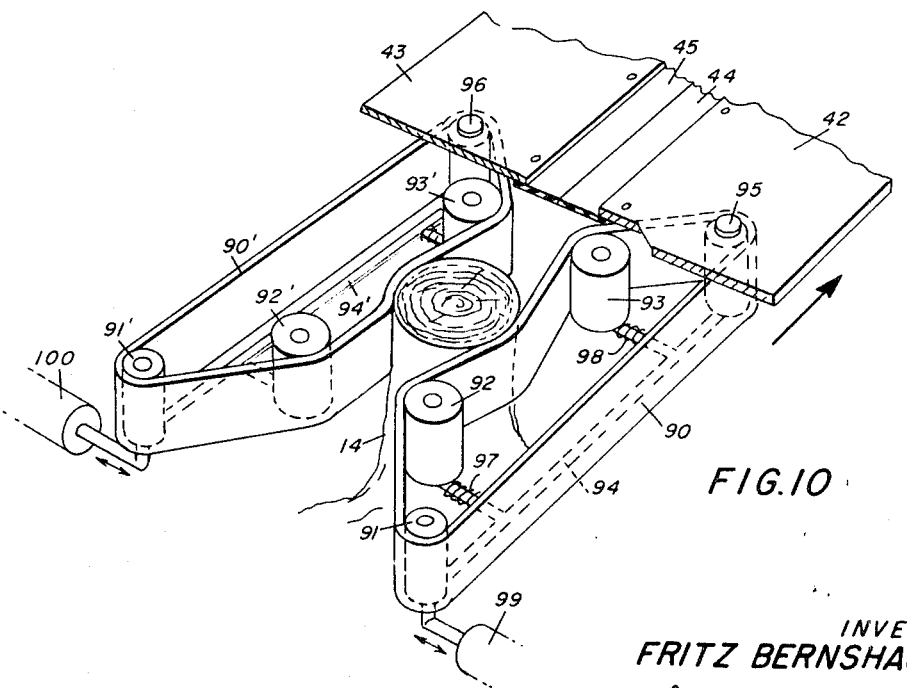
FIG. 10 is a perspective view of an alternative form of tree shaker. Like parts of the embodiment are designated by the same number in all of the drawings and in the specification.

An alternative form of tree shaker is shown in FIG. 10. Two belts, 90, 90' are mounted beneath the lower deck 42, 43 of the machine so that a tree trunk may pass between them. Rollers 91, 92, 93 and 91', 92', 93' on which the respective belts turn, are mounted on respective frames 94, 94' and are pivoted to the lower deck plates 42, 43 at connection points 95, 96, respectively. The forward sets of rollers 92, 93 on frame 94 are yieldably mounted to the frame by means of heavy springs, illustrated diagrammatically at 97, 98 so that they may be forced backward a sufficient distance to allow a tree trunk to pass into the space between the belts. The rollers 92' and 93' on frame 94' are similarly mounted. Hydraulic rams 99 and 100, mounted to the frame of the harvesting machine oscillate in unison to impart a shaking movement to the belts 90 and to the tree trunk passing therebetween. This form of shaker has advantages that no external centering controls are required, and the length of shaking time may be altered merely by changing the length of the belts 90, 90' and the spacing of the corresponding rollers 91, 92 and 91', 43.

The cushioning material withdrawal station is shown more clearly in FIG. 5. As illustrated in this perspective view, vertical duct 36' is mounted on side member 8' adjacent the opening 62, 62' in deck plates 42, 43. Note that flexible sealing flaps 44, 45 continue across the opening 62, 62' to close off the space formed between conveyors 40, 41; the flaps and the conveyors thus form a bottom for the containers at this point, in place of the deck plates 42, 43. As the circular opening 62, 62' moves under each container in turn, the cushioning and the fruit falls down onto the conveyors 40, 41. A fan located in vertical duct 36' pulls air through opening 66' and this moving air entrains the cushioning material and causes it to be conveyed upwardly through duct 36'. A similar fan arrangement is provided in duct 36. The fruit, being heavier than the pieces of cushioning, is not entrained in the air stream, but is deposited upon conveyors 40, 41 running along each side of the machine. Bars 68' are provided over opening 66' to prevent any fruit from rolling into duct 36'. In addition, the conveyor belts may have a loose pile surface or the like to prevent the fruit from being rolled off the sides of the conveyors as the system progresses along the tree row. The flexible flaps 44, 45 extending across the semicircular cutout 62, 62' insure that any fruit settling out of the container in the center of the harvesting machine will be deflected to the side to be collected by of the conveyors 40, 41.

Lower guide tracks 50', 51' (not shown) similar to the guide tracks 50, 51 shown in FIG. 6 preferably are provided to guide the lower edge of the extended partition bracket generally along the paths indicated by lines 70 and 71.

To assist in removing the cushioning from the containers, high pressure air manifolds 72 may be provided with air nozzles 73 directed toward opening 66' in duct 36', and toward the corresponding opening in duct 36, to impinge upon the descending cushioning and move it towards the collecting opening 66'. High pressure air is supplied to these nozzles either from a precharged high pressure air tank, or from a compressor driven by engine 10. Vertical duct 36, with a corresponding opening 66, is located at the opposite side of the machine at the cushioning withdrawal station, as was shown in FIG. 4.

Figure 9:
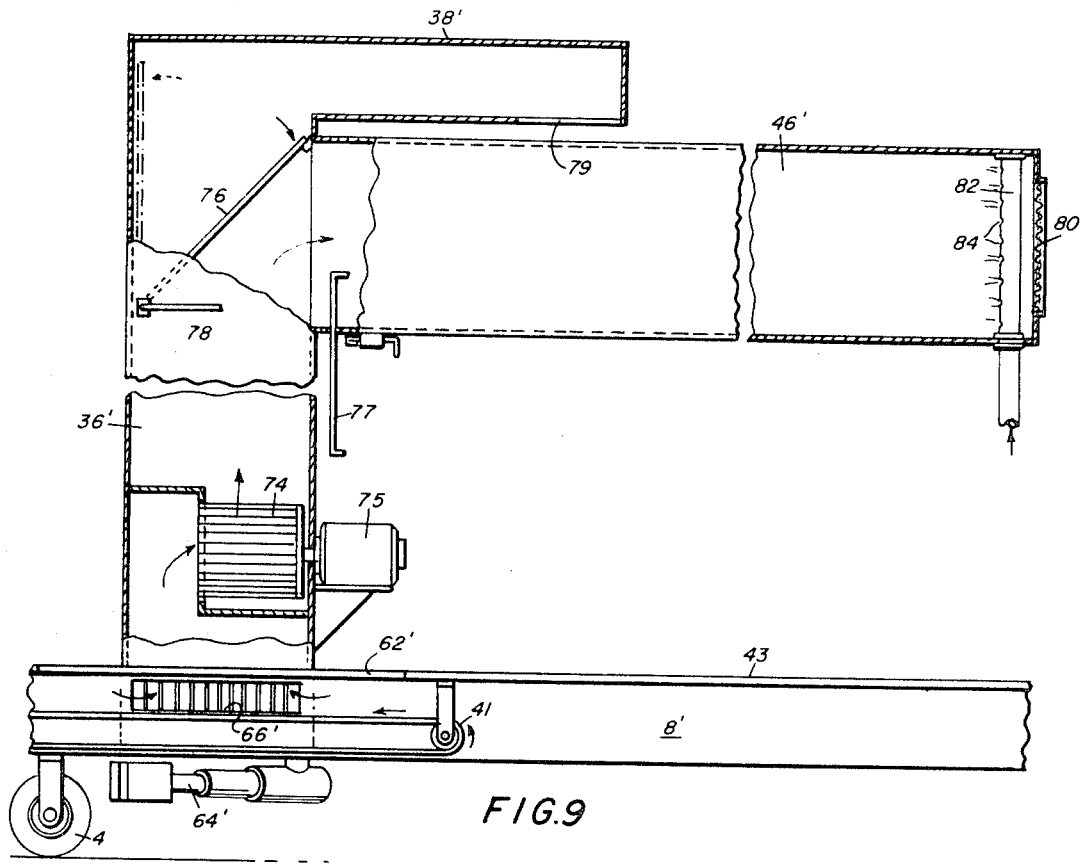
FIG. 9 is a sectional elevation showing the cushioning withdrawal station and conveying and storage system.

The cushioning withdrawal and conveying system is shown in more detail in FIG. 9. Fan 74, mounted in duct 36' and driven by motor 75, draws the cushioning through opening 66' and up duct 36'. A swinging 76 installed in duct 36' is positioned by manual actuator 78. A sliding gate 77 is provided at the opening of chamber 46'. When the machine is in harvesting operation, damper 76 is in a vertical position, gate 77 closes the opening of chamber 46', and cushioning advances up duct 36' and out duct 38' to be deposited in the appropriate advancing container through opening 79. If for any reason it is desired to stop harvesting operations, such as when the machine reaches the end of a row, damper 76 is pivoted to a diagonal position blocking communication to duct 38' from duct 36', and gate 77 is opened to allow communication between duct 36 and storage chamber 46'. Cushioning is blown into storage chamber 46' and is collected there while the air stream passes out through screened opening 80 at the end of storage chamber 46'. A high pressure air manifold 82 is installed in the end of storage chamber 46' with nozzles 84 pointed in the direction of vertical duct 36'. When it is desired to resume harvesting operations, damper 76 is moved once again to its vertical position, fan 74 is started, gate 77 is opened, and high air is blown through nozzles 84 to force the cushioning out of storage chamber 46' and into vertical duct 36', where it again passes through duct 38' and out through opening 79. When chamber 46' is empty, the air supply to nozzles 84 is cut off, gate 77 is closed and the system resumes normal operation. The process of removing the cushioning from storage chamber 46' may be speeded by sealing screened opening 80 with an appropriate plate or damper. Alternatively, a bypass duct and damper arrangement may be added to cause the air from fan 74 to flow through opening 80 and storage chamber 46' before it enters duct 36', thereby allowing omission of high pressure air manifold 82. High pressure air is supplied manifold 82 from the same source that supplies air manifolds 72.

Reviewing the harvesting operation, it is seen that as the machine continuously advances along a tree row, the rollably supported points 57, 58 of the partitioning 32 and the rollably supported points 47', 58' of the partitioning 33 are extended by tracks 50, 50' and 51, 51', respectively, to form generally cylindrical containers about trees on the interior of the harvesting machine. As the machine advances, a given container is filled with cushioning material, a tree shaker engages the trunk of the tree and dislodges the fruit therefrom, and the cushioning material surrounding the tree and the fruit prevents the fruit from falling and being bruised by impact with branches of the tree or with a collecting frame. The partitions 32, 33 are driven along the interior of the machine by a chain drive, and their speed is adjusted so that they are stationary with respect to the trees on the interior of the machine. As the machine advances, a cushioning withdrawal station moves into communication with the container, where the cushioning is withdrawn from the container by a pneumatic conveying system. The cushioning moves through openings 66, 66', up ducts 36, 36', and out ducts 38, 38', to be deposited in the container surrounding the next tree in the direction in which the machine is advancing. As the cushioning material is withdrawn, the fruit is gently deposited upon conveyors 40, 41 and collected in appropriate receptacles. When the cushioning withdrawal operation is complete, the partitions 32, 33 are withdrawn from around the tree to allow the tree to pass off the rear of the machine and, as the partitions 32, 33 are formed in two continuous belts, one at each side of the machine, a new container is formed at the front of the machine about a new tree moving into the interior of the machine. When it is desired to cease harvesting operations, the cushioning material is stored in storage chambers 46 and 46'.

The major advantages of the system are that tree rows may be spaced substantially closer together than is possible with prior devices, thus allowing more fruit production per acre, and that multiple operations may be accomplished with one basic system, thus reducing capital outlay required for orchard equipment. Substantially less manual labor is required than with prior devices and methods, and the fruit is harvested without subjecting it to sharp impacts which cause bruising and reduce the marketability of the crop.

This constitutes a general description of but one embodiment of the invention, and modifications will be obvious to those skilled in the art. It is intended that all such modifications be encompassed within the scope of the claims which follow.

I claim:

1. In an apparatus for surrounding a fruit tree with a container for receiving harvested fruit therefrom, first and second extendable partition means mounted on first and second frame members, respectively, said partition means being locatable on opposite sides of a tree to be harvested; means for extending first portions of each of said partition means so as to form a first substantially continuous container around said tree; means for harvestng said fruit from said tree; said first and second frame members being movable continuously past said tree; and said first and second partition means being movably mounted on said first and second frame means for maintaining said first container stationary with respect to said tree when said first and second frame members are moved.

2. The apparatus of claim 1, wherein said frame members carry deck means arranged to form a bottom for said first container.

3. The apparatus of claim 1, wherein said first and second partition means are mounted on said first and second frame means by means of overhead tracks which carry roller means affixed to spaced points on said partition means, said tracks being so shaped as to extend said portions of said partition means to form said first container as said first and second frame members move past said tree.

4. The apparatus of claim 3, further including deck means carried by said first and second frame members to form a bottom for said first container, said deck means including a withdrawal station initially located outside said first container but movable with said first and second frame members to a location permitting withdrawal of harvested fruit from said first container.

5. The apparatus of claim 4, further including means for substantially filling said first container with cushioning material while said withdrawal station is outside said first container, and means at said withdrawal station for removing said cushioning material and harvested fruit from said first container when said withdrawal station is in communication with said first container.

6. The apparatus of claim 5 further including means for disassembling said first container after removal therefrom of said harvested fruit and said cushioning material and for thereafter forming a second container around a second tree to be harvested.

7. The apparatus of claim 2, wherein said harvesting means includes means for detaching fruit from said tree; cushioning material deposited in said first container; a conveying system for transferring said cushioning material from said first container; and means for separating said fruit from said cushioning material.

8. The apparatus of claim 7, including means for extending second portions of each of said partition means so as to form a second container around a second tree, and wherein said conveying system includes means for transferring said cushioning material form said first container to said second container, said deck means forming a bottom for said second container.

9. The apparatus of claim 8, wherein said conveying system comprises: a fan; a duct connecting the inlet of said fan with the bottom of said first container; and a duct connecting the discharge of said fan with said second container.

10. The apparatus of claim 9, wherein said means for detaching said fruit from said trees comprises means for mechanically shaking said trees.

11. The apparatus of claim 10, wherein said means for mechanically shaking said trees comprises: a frame movably mounted to said apparatus; a belt rollably mounted on said frame; and means for oscillating said frame when said belt is in contact with said tree.

12. The apparatus of claim 1, further including sprayer means attached to said apparatus for spraying said tree; and means for selectively operating said sprayer means and said harvesting means.

13. The apparatus of claim 1, further including cutting means for severing portions of the branches of said tree; sprayer means for spraying said tree; and means for selectively operating said cutting means, sprayer means and harvesting means.